US012715588B2

(12) United States Patent
Hanrahan

(10) Patent No.: US 12,715,588 B2
(45) Date of Patent: Aug. 25, 2026

(54) THERMAL ANTI-ICING SYSTEM FOR AIRCRAFT AIRFRAME EXTERIOR SURFACE

(71) Applicant: RTX Corporation, Farmington, CT (US)

(72) Inventor: Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/647,407

(22) Filed: Apr. 26, 2024

(65) Prior Publication Data

US 2025/0333181 A1 Oct. 30, 2025

(51) Int. Cl.
*B64D 15/06* (2006.01)
*B64C 39/10* (2006.01)

(52) U.S. Cl.
CPC ........ *B64D 15/06* (2013.01); *B64C 2039/105* (2013.01)

(58) Field of Classification Search
CPC ........ B64D 15/02; B64D 15/04; B64D 15/06; B64C 2039/105
See application file for complete search history.

(56) References Cited

U.S. PATENT DOCUMENTS 3,174,282 A 3/1965 Harrison
5,011,098 A 4/1991 McLaren
5,484,122 A 1/1996 Desalve
8,746,613 B2 6/2014 Suchezky
10,823,066 B2 * 11/2020 Miller ..................... F01D 11/24
11,125,158 B2 9/2021 Bouldin
11,230,943 B2 1/2022 Wallin
11,939,059 B2 3/2024 Page
2013/0187007 A1 * 7/2013 Mackin ..................... F02C 9/18 60/785
2017/0036775 A1 * 2/2017 Jones ........................ F01P 3/20
2018/0038280 A1 * 2/2018 Rogero .................. F02C 7/224
2021/0107676 A1 4/2021 Sibbach
2023/0242254 A1 * 8/2023 Page ........................ B60Q 3/43 244/118.5
2025/0172092 A1 * 5/2025 Durocher .............. B64D 37/34

OTHER PUBLICATIONS

EP Search Report for EP Patent Application No. 25172919.0 dated Jun. 16, 2025.

* cited by examiner

*Primary Examiner* — Magdalena Topolski
*Assistant Examiner* — Shanna Danielle Glover
(74) *Attorney, Agent, or Firm* — Getz Balich LLC

(57) ABSTRACT

An aircraft is provided which includes an airframe, a propulsion system and a thermal anti-icing system. The airframe includes a body and a plurality of wings. The body extends longitudinally along a centerline. The wings are disposed to opposing lateral sides of the body. Each of the wings projects spanwise out from the body. The propulsion system is connected to the airframe. The thermal anti-icing system is configured to heat a region of an exterior surface of the airframe longitudinally upstream of and laterally overlapping with the propulsion system.

20 Claims, 11 Drawing Sheets

THERMAL ANTI-ICING SYSTEM FOR AIRCRAFT AIRFRAME EXTERIOR SURFACE

BACKGROUND OF THE DISCLOSURE

1. Technical Field

This disclosure relates generally to an aircraft and, more particularly, to a thermal anti-icing system for an exterior surface of the aircraft.

2. Background Information

Various types and configurations of thermal anti-icing systems are known in the art for heating an exterior surface of an aircraft. While these known thermal anti-icing systems have various benefits, there is still room in the art for improvement.

SUMMARY OF THE DISCLOSURE

According to an aspect of the present disclosure, an aircraft is provided which includes an airframe, a propulsion system and a thermal anti-icing system. The airframe includes a body and a plurality of wings. The body extends longitudinally along a centerline. The wings are disposed to opposing lateral sides of the body. Each of the wings projects spanwise out from the body. The propulsion system is connected to the airframe. The thermal anti-icing system is configured to heat a region of an exterior surface of the airframe longitudinally upstream of and laterally overlapping with the propulsion system.

According to another aspect of the present disclosure, another aircraft is provided which includes an airframe, a propulsion system and a thermal anti-icing system. The airframe includes a body and a plurality of wings. The body extends longitudinally along a centerline. The wings are disposed to opposing lateral sides of the body. Each of the wings projects spanwise out from the body. The propulsion system is connected to the airframe. The propulsion system includes a propulsor rotor and a turbine engine core configured to drive rotation of the propulsor rotor. The turbine engine core includes a core flowpath. The thermal anti-icing system includes a heat exchanger and a fluid heating circuit. The heat exchanger includes a combustion products passage and a working fluid passage. The combustion products passage is fluidly couplable to the core flowpath. The working fluid passage is fluidly couplable to the fluid heating circuit. The fluid heating circuit extends along a region of an exterior surface of the airframe longitudinally upstream of and laterally aligned with the propulsor rotor. The fluid heating circuit is in thermal communication with material of the airframe forming the region of the exterior surface of the airframe.

According to still another aspect of the present disclosure, another aircraft is provided which includes a blended wing body airframe, a propulsion system and a thermal anti-icing system. The propulsion system is connected to the blended wing body airframe. The propulsion system includes a propulsor rotor and a turbine engine core configured to drive rotation of the propulsor rotor. The turbine engine core includes a combustor section and a core flowpath. The thermal anti-icing system includes a heat exchanger and a fluid heating circuit. The heat exchanger includes a combustion products passage and a working fluid passage. The combustion products passage is fluidly couplable to the core flowpath downstream of the combustor section. The working fluid passage is fluidly couplable to the fluid heating circuit. The fluid heating circuit extends along, and in thermal communication with material of the blended wing body airframe forming, an exterior surface of the blended wing body airframe.

The aircraft may be a blended wing body aircraft. The body may include the material of the airframe forming the region of the exterior surface of the airframe.

The propulsion system may be next to and above a top side of the airframe. The exterior surface of the airframe may be disposed at the top side of the airframe.

The propulsion system may be connected to the airframe at a top side of the airframe. The exterior surface of the airframe may be disposed at the top side of the airframe.

The region of the exterior surface of the airframe may be longitudinally upstream of and may laterally overlap a propulsor rotor of the propulsion system.

The region of the exterior surface of the airframe may be longitudinally upstream of and may laterally overlap an airflow inlet into the propulsion system.

The region of the exterior surface of the airframe may extend longitudinally to a leading edge of the airframe.

The region of the exterior surface of the airframe may extend longitudinally upstream from the propulsion system towards a leading edge of the airframe.

The region of the exterior surface of the airframe may have a longitudinal length and a lateral width. The lateral width may have a uniform value longitudinally along at least a section of the longitudinal length.

The region of the exterior surface of the airframe may have a longitudinal length and a lateral width. The lateral width may change longitudinally along at least a section of the longitudinal length.

A lateral width of the region of the exterior surface of the airframe may increase as the region of the exterior surface of the airframe extends longitudinally in an upstream direction away from the propulsion system.

The thermal anti-icing system may include a fluid heating circuit. The fluid heating circuit may be disposed in the airframe. The fluid heating circuit may extend along the region of the exterior surface of the airframe.

The fluid heating circuit may have a uniform lateral width as at least a section of the fluid heating circuit extends longitudinally along the region of the exterior surface of the airframe.

The fluid heating circuit may have a lateral width that changes as at least a section of the fluid heating circuit extends longitudinally along the region of the exterior surface of the airframe.

A lateral width of the fluid heating circuit may increase as at least a section of the fluid heating circuit extends longitudinally along the region of the exterior surface of the airframe in an upstream direction away from the propulsion system.

The thermal anti-icing system may also include a working fluid and a heat exchanger fluidly coupled to the fluid heating circuit. The heat exchanger may be configured to transfer heat energy from combustion products generated by the propulsion system into the working fluid. The fluid heating circuit may be configured to transfer the heat energy from the working fluid into material of the airframe forming the exterior surface of the airframe within the region.

The propulsion system may include a flowpath, a compressor section, a combustor section and a turbine section. The flowpath may extend through the compressor section, the combustor section and the turbine section from an inlet into the flowpath to an exhaust from the flowpath. The heat exchanger may be arranged along the flowpath downstream of the combustor section.

The thermal anti-icing system may also include a flow regulator configured to selectively bleed the combustion products from the core flowpath and direct the combustion products through the heat exchanger.

The propulsion system may include a flowpath, a compressor section, a combustor section and a turbine section. The flowpath may extend through the compressor section, the combustor section and the turbine section from an inlet into the flowpath to an exhaust from the flowpath. The heat exchanger may be arranged along the flowpath between the turbine section and the exhaust from the flowpath.

The body may include the region of the exterior surface of the airframe.

The airframe may be configured as a blended body aircraft airframe.

The propulsion system may be configured as or otherwise include a turbofan propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
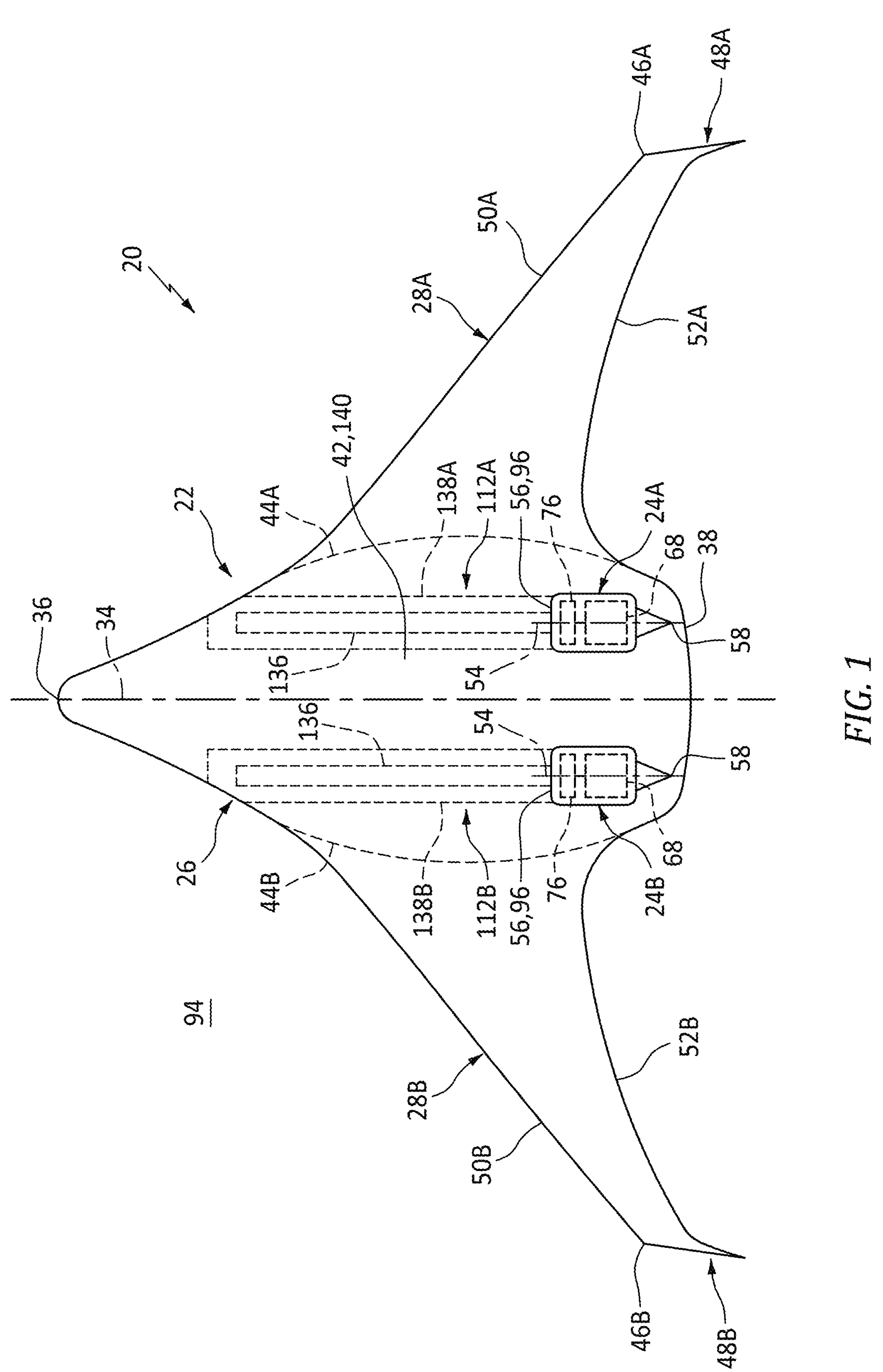
FIG. 1 is a plan view illustration of an aircraft.

FIG. 1 illustrates a blended wing body (BWB) aircraft 20. This aircraft 20 includes a blended wing body (BWB) aircraft airframe 22 and one or more propulsion systems 24A and 24B (generally referred to as "24"). The aircraft airframe 22 of FIG. 1 includes a body 26 (e.g., a fuselage) and one or more wings 28A and 28B (generally referred to as "28").

Figure 2:
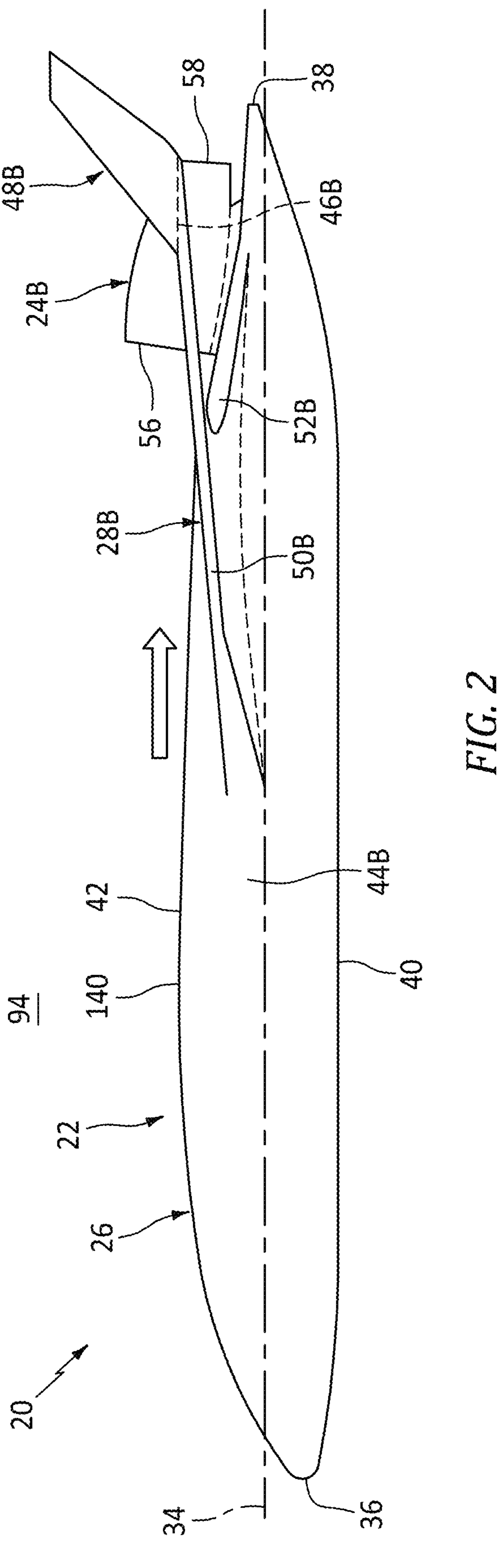
FIG. 2 is a side view illustration of the aircraft.
Figure 3:
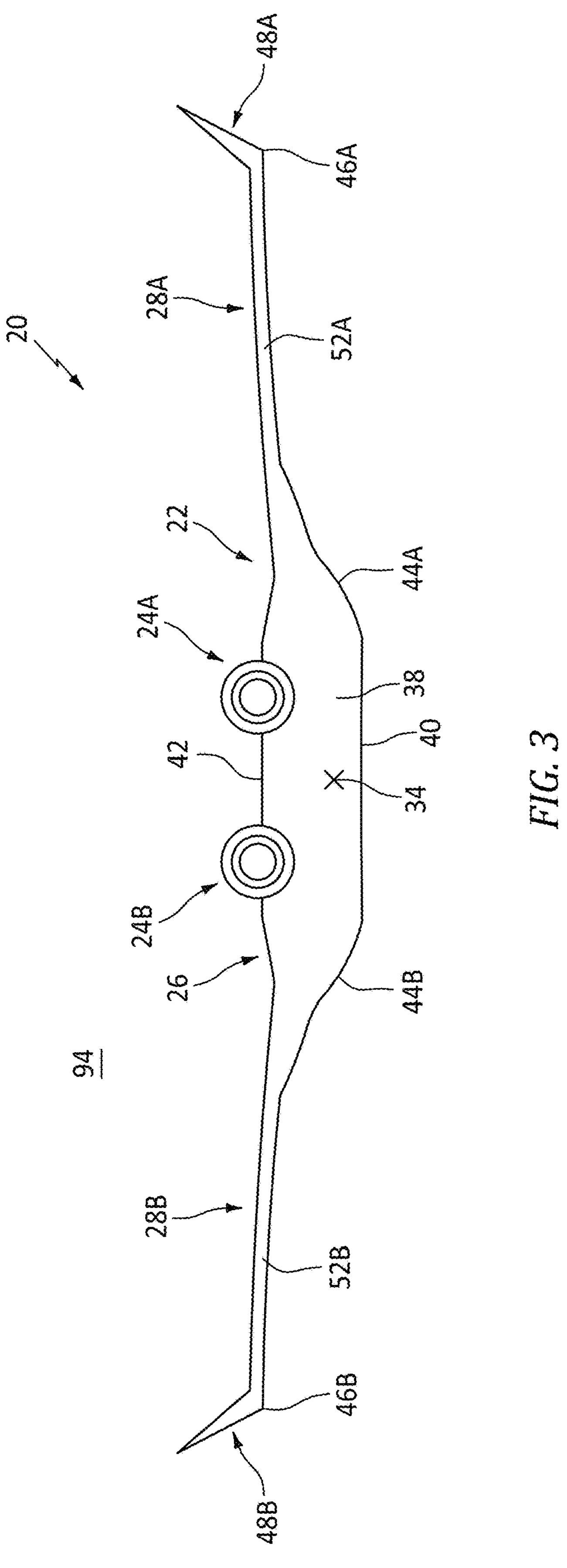
FIG. 3 is a rear end view illustration of the aircraft.

The aircraft body 26 extends longitudinally along a centerline 34 between and to a forward, upstream end 36 (e.g., a nose) of the aircraft body 26 and an aft, downstream end 38 of the aircraft body 26. This centerline 34 may be a centerline axis of the aircraft 20, the aircraft airframe 22 and/or the aircraft body 26. Referring to FIG. 2, the centerline 34 may be substantially (e.g., within +/−five degrees) or completely parallel with a horizon line when the aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28A and 28B of FIGS. 1 and 3 are arranged to the opposing lateral sides 44A and 44B of the aircraft body 26. Each of the aircraft wings 28 is connected to (e.g., fixed to) the aircraft body 26. Each of the aircraft wings 28A, 28B projects spanwise along a span line of the respective aircraft wing 28 out from the aircraft body 26, at the respective body lateral side 44A, 44B, to a distal tip 46A, 46B of the respective aircraft wing 28. At the wing tip 46A, 46B, the respective aircraft wing 28 may (or may not) be configured with a winglet 48A, 48B. Each of the aircraft wings 28A, 28B of FIG. 1 extends longitudinally along a mean line of the respective aircraft wing 28 from a leading edge 50A, 50B (generally referred to as "50") of the respective aircraft wing 28 to a trailing edge 52A, 52B (generally referred to as "52") of the respective aircraft wing 28. The wing leading edge 50 of FIG. 1, at a base of the respective aircraft wing 28, is longitudinally spaced aft, downstream from the body forward end 36. The wing trailing edge 52 of FIG. 1, at the wing base, is longitudinally spaced forward, upstream from the body aft end 38. The present disclosure, however, is not limited to such an exemplary aircraft wing arrangement.

Figure 4:
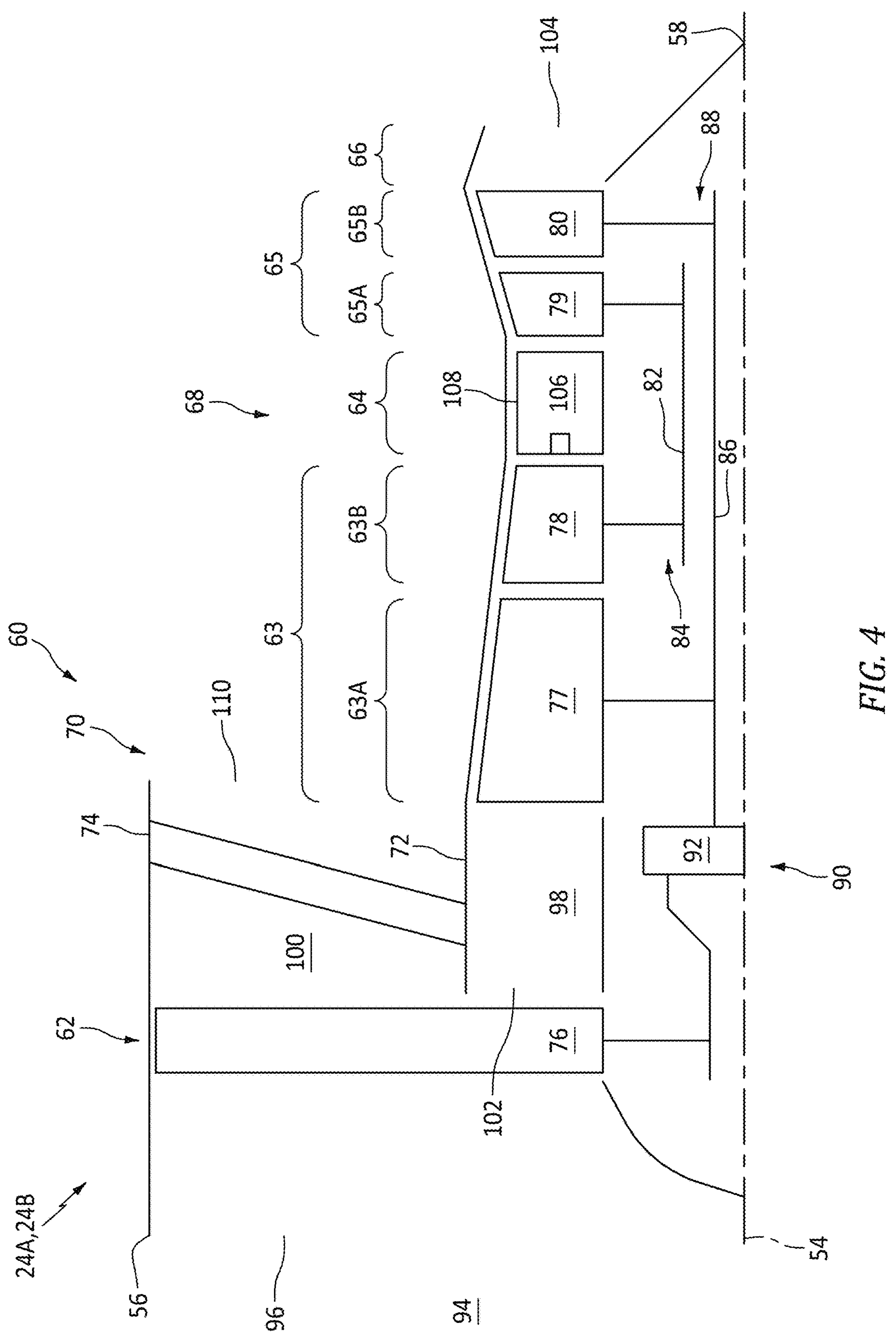
FIG. 4 is a partial schematic sectional illustration of a propulsion system for the aircraft.

Referring to FIG. 4, each aircraft propulsion system 24 extends axially along an axis 54 from a forward, upstream end 56 of the aircraft propulsion system 24 to an aft, downstream end 58 of the aircraft propulsion system 24. This axis 54 may be a centerline axis of the individual aircraft propulsion system 24 and/or one or more components of the individual aircraft propulsion system 24. In other words, each aircraft propulsion system 24 includes a respective centerline axis that is different from the centerline axis of another (e.g., second) aircraft propulsion system 24 associated with the aircraft 20. The axis 54 may also or alternatively be a rotational axis of one or more components of the aircraft propulsion system 24.

Each aircraft propulsion system 24 is configured as or otherwise includes a turbine engine 60 such as a turbofan turbine engine. The turbine engine 60 of FIG. 4, for example, includes a fan section 62, a compressor section 63, a combustor section 64, a turbine section 65 and an exhaust section 66. The compressor section 63 of FIG. 4 includes a low pressure compressor (LPC) section 63A and a high pressure compressor (HPC) section 63B. The turbine section 65 of FIG. 4 includes a high pressure turbine (HPT) section 65A and a low pressure turbine (LPT) section 65B. The LPC section 63A, the HPC section 63B, the combustor section 64, the HPT section 65A and the LPT section 65B may collectively form a core 68 of the turbine engine 60.

The engine sections 64-66 are housed within and/or may be formed by a stationary engine housing 70. This engine housing 70 includes a housing inner structure 72 (e.g., a core case and inner nacelle structure) and a housing outer structure 74 (e.g., a fan case and outer nacelle structure). The inner structure 72 may house the engine core 68 and its engine sections 63A-65B. The inner structure 72 may also form the exhaust section 66. The outer structure 74 may house at least the fan section 62.

Each of the engine sections 62, 63A, 63B, 65A and 65B includes a respective bladed rotor 76-80. Each of these engine rotors 76-80 includes a plurality of rotor blades arranged circumferentially around and connected to one or more respective rotor disks or hubs. The rotor blades, for example, may be formed integral with or mechanically fastened, welded, brazed and/or otherwise attached to the respective rotor disk(s) or hub(s).

The HPC rotor 78 is coupled to and rotatable with the HPT rotor 79. The HPC rotor 78 of FIG. 4, for example, is connected to the HPT rotor 79 through a high speed shaft 82. At least (or only) the HPC rotor 78, the HPT rotor 79 and the high speed shaft 82 may collectively form a high speed rotating assembly 84; e.g., a high speed spool of the engine core 68. The high speed rotating assembly 84 of FIG. 4 and its members 78, 79 and 82 are configured to rotate about the axis 54.

The LPC rotor 77 is coupled to and rotatable with the LPT rotor 80. The LPC rotor 77 of FIG. 4, for example, is connected to the LPT rotor 80 through a low speed shaft 86. At least (or only) the LPC rotor 77, the LPT rotor 80 and the low speed shaft 86 may collectively form a low speed rotating assembly 88; e.g., a low speed spool of the engine core 68. This low speed rotating assembly 88 is also coupled to and rotatable with the fan rotor 76 through a drivetrain 90. This drivetrain 90 may be configured as a geared drivetrain, where a geartrain 92 (e.g., a transmission, a speed change device, an epicyclic geartrain, etc.) is disposed between and operatively couples the fan rotor 76 to the low speed rotating assembly 88 and its LPT rotor 80. With this arrangement, the fan rotor 76 may rotate at a different (e.g., slower) rotational velocity than the low speed rotating assembly 88 and its LPT rotor 80. However, the drivetrain 90 may alternatively be configured as a direct drive drivetrain, where the geartrain 92 is omitted. With this arrangement, the fan rotor 76 rotates at a common (the same) rotational velocity as the low speed rotating assembly 88 and its LPT rotor 80. Referring again to FIG. 4, the low speed rotating assembly 88 and its members 77, 80 and 86 as well as the fan rotor 76 are configured to rotate about the axis 54.

During operation, air from an environment 94 external to the aircraft 20 enters each aircraft propulsion system 24 through an airflow inlet 96 into the respective aircraft propulsion system 24 and its turbine engine 60. This propulsion system inlet 96 of FIG. 4 is disposed at (e.g., on, adjacent or proximate) the propulsion system upstream end 56. The incoming air is directed through the fan section 62 and into a (e.g., annular) core flowpath 98 and a (e.g., annular) bypass flowpath 100. The core flowpath 98 extends sequentially through the engine sections 63A-66 from an airflow inlet 102 into the core flowpath 98 to a combustion products exhaust 104 from the core flowpath 98. The air within the core flowpath 98 may be referred to as “core air”. The bypass flowpath 100 extends through a bypass duct, where the bypass flowpath 100 bypasses (e.g., extends longitudinally along, circumferentially around and outside of) the engine sections 63A-66 and the inner structure 72 houses the engine core 68. The air within the bypass flowpath 100 may be referred to as “bypass air”.

The core air is compressed by the LPC rotor 77 and the HPC rotor 78 and directed into a (e.g., annular) combustion chamber 106 of a (e.g., annular) combustor 108 in the combustor section 64. Fuel is injected into the combustion chamber 106 and mixed with the compressed core air to provide a fuel-air mixture. This fuel-air mixture is ignited and combustion products thereof flow through and sequentially drive rotation of the HPT rotor 79 and the LPT rotor 80 before being exhausted into the external environment 94 from the respective aircraft propulsion system 24 and its turbine engine 60 through the exhaust section 66 and its core exhaust 104. The rotation of the HPT rotor 79 and the LPT rotor 80 respectively drive rotation of the HPC rotor 78 and the LPC rotor 77 and, thus, compression of the air received from the core inlet 102. The rotation of the LPT rotor 80 also drives rotation of the fan rotor 76. The rotation of the fan rotor 76 propels the bypass air through the bypass flowpath 100 and out of the respective aircraft propulsion system 24 and its turbine engine 60 through an airflow exhaust 110 from the bypass flowpath 100. The propulsion of this bypass air into the external environment 94 may account for a majority of thrust generated by the turbine engine 60, e.g., more than seventy-five percent (75%) of engine thrust. The turbine engine 60 of the present disclosure, however, is not limited to the foregoing exemplary thrust ratio.

Referring to FIG. 1, under certain environmental conditions, ice may form and accumulate on one or more exterior surfaces of the aircraft airframe 22. Such ice accumulation on the aircraft airframe 22 may decrease aerodynamic efficiency of the aircraft 20 and/or otherwise impede normal operation of the aircraft 20 during flight. Such ice accumulation may also be detrimental to normal operation of the aircraft propulsion systems 24 if, for example, the ice dislodges from the aircraft airframe 22 and is ingested into one or more of the aircraft propulsion systems 24 through their propulsion system inlets 96. The aircraft 20 of FIG. 1 therefore includes one or more thermal anti-icing systems 112A and 112B (generally referred to as “112”) to prevent or reduce ice accumulation on the aircraft airframe 22.

Figure 5:
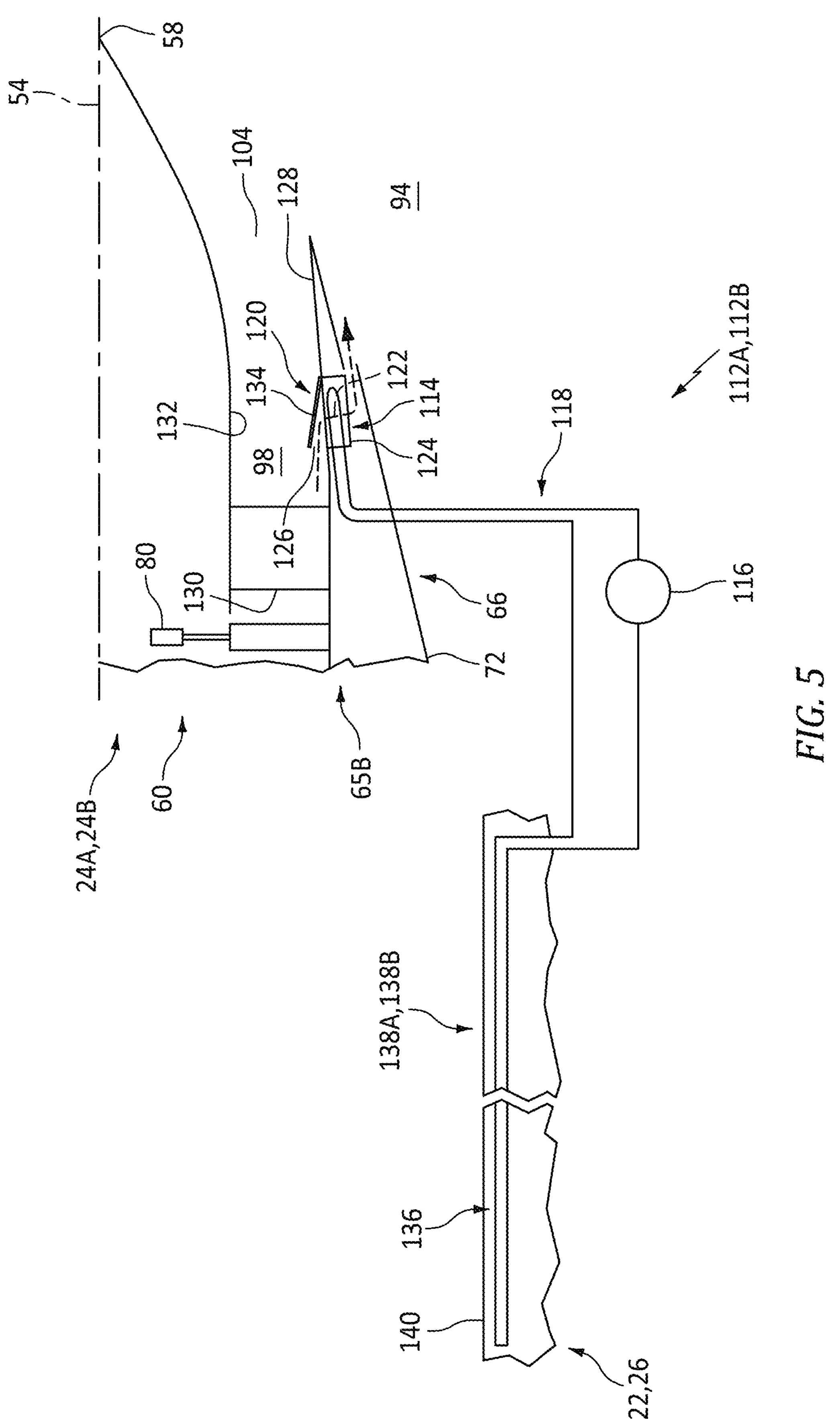
FIG. 5 is a schematic illustration of a thermal anti-icing system arranged with the propulsion system and an airframe of the aircraft, where a flow regulator for the thermal anti-icing system is in an open position.

Referring to FIG. 5, each thermal anti-icing system 112 includes a heat exchanger 114, a fluid pump 116, a heating loop 118 and a working fluid (e.g., a liquid heat exchange fluid) within the heating loop 118. The thermal anti-icing system 112 also includes a flow regulator 120.

The heat exchanger 114 is configured to transfer thermal energy from the combustion products generated within the combustion chamber 106 (see FIG. 1) into the working fluid. The heat exchanger 114 of FIG. 5, for example, is configured as a gas-to-liquid heat exchanger. This heat exchanger 114 includes a combustion products passage 122 (see dashed line) and a working fluid passage 124 (see solid line). The heat exchanger passages 122 and 124 are fluidly decoupled from one another and may be arranged in a cross-flow arrangement, a counterflow arrangement and/or a parallel flow arrangement within the heat exchanger 114. An inlet into the combustion products passage 122 may be fluidly coupled to the core flowpath 98 through the flow regulator 120. An outlet from the combustion products passage 122 may be fluidly coupled to the external environment 94 (or the bypass flowpath 100). This outlet from the combustion products passage 122 may be the same as (or different than) an outlet from the engine housing 70 and its housing inner structure 72 for inner structure cooling air; e.g., nacelle cooling air. The working fluid passage 124 forms a section of the heating loop 118 that extends through the heat exchanger 114.

Figure 7:
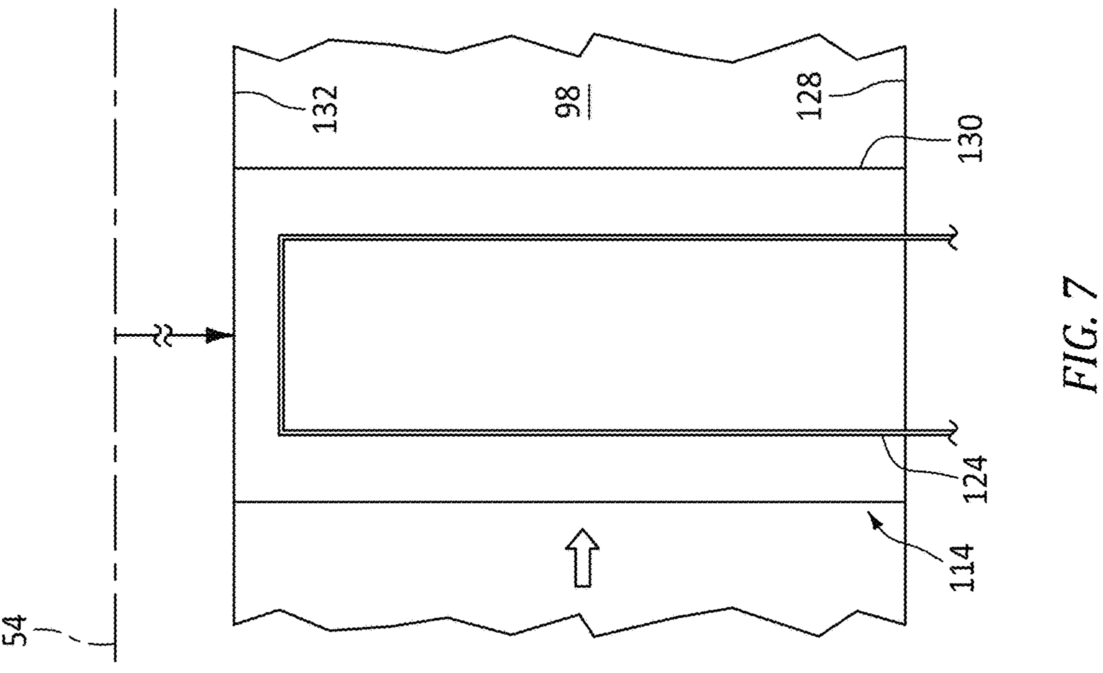
FIGS. 6 and 7 are illustrations of various heat exchanger arrangements with the propulsion system.
Figure 6:
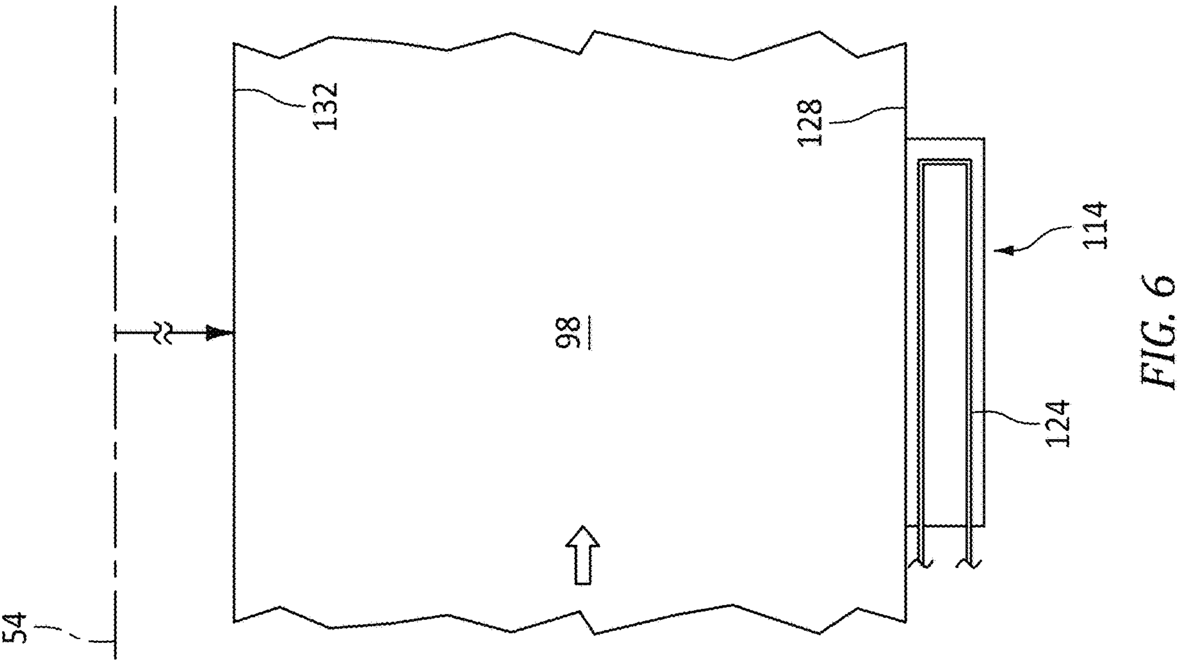

The heat exchanger 114 of FIG. 5 is disposed along the core flowpath 98 within/along the exhaust section 66. This heat exchanger 114 may be housed within the inner structure 72 radially outboard of the core flowpath 98. Here, the combustion products passage 122 and its inlet are fluidly coupled to the core flowpath 98 by a bleed port 126, which bleed port 126 may be formed by or upstream of the flow regulator 120. The bleed port 126 of FIG. 5 is also disposed along the core flowpath 98 within/along the exhaust section 66. The heat exchanger 114 of FIG. 5 is thereby operable to transfer thermal energy from combustion products bled by the bleed port 126 from the core flowpath 98 within the exhaust section 66 into the working fluid. It is contemplated, however, the bleed port 126 and/or the heat exchanger 114 may alternatively be otherwise located along the core flowpath 98 at a location downstream of the combustor section 64 (see FIG. 4). In addition, while the bleed port 126 of FIG. 5 is illustrated as being arranged proximate the heat exchanger 114, it is contemplated the heat exchanger 114 may alternatively be arranged remote from the bleed port 126 and the core flowpath 98. Moreover, while the heat exchanger 114 is shown in FIG. 5 is being outside of and radially spaced from the core flowpath 98, it is contemplated the heat exchanger 114 may alternatively be configured as part of another component of the turbine engine 60 which forms a peripheral boundary of or projects into the core flowpath 98. The heat exchanger 114 of FIG. 6, for example, is part of an outer flowpath wall 128 along the core flowpath 98. In another example, the heat exchanger 114 of FIG. 7 is part of a vane 130 (e.g., a turbine exhaust vane) projecting radially across the core flowpath 98 from the outer flowpath wall 128 to an inner flowpath wall 132. The heat exchanger 114, however, is described below with reference to the arrangement of FIG. 5 for ease of description.

The flow regulator 120 is configured to selectively fluidly couple, fluidly decouple and/or otherwise regulate the flow of bled combustion products from the core flowpath 98 to the heat exchanger 114 and its combustion products passage 122. The flow regulator 120 of FIG. 5, for example, includes at least one movable flow regulator door 134 such as a pivoting door (e.g., a louver door) or a translating door. This regulator door 134 is configured to move (e.g., pivot or translate) between an open position (see FIG. 5) and a closed position (see FIG. 8), and optionally between one or more intermediate positions between the open position and the closed position. In the open position of FIG. 5, the flow regulator 120 fluidly couples the bleed port 126 and, thus, the core flowpath 98 to the heat exchanger 114 and its combustion products passage 122. With the arrangement of FIG. 5, the flow regulator 120 also opens the bleed port 126. In the closed position of FIG. 8, the flow regulator 120 fluidly decouples the bleed port and, thus, the core flowpath 98 from the heat exchanger 114 and its combustion products passage 122. With the arrangement of FIG. 8, the flow regulator 120 also closes the bleed port. The present disclosure, however, is not limited to such an exemplary flow regulator configuration. The flow regulator 120, for example, may alternatively be configured as another type of valve or actuatable opening.

The heating loop 118 of FIG. 5 is a closed loop heat exchange loop. This heating loop 118 includes a fluid heating circuit 136 disposed outside of the aircraft propulsion system 24 and arranged with the aircraft airframe 22. The fluid heating circuit 136 of FIG. 5 is fluidly coupled inline with the heat exchanger 114 and the fluid pump 116 along the heating loop 118, for example upstream of the heat exchanger 114.

Figure 9:
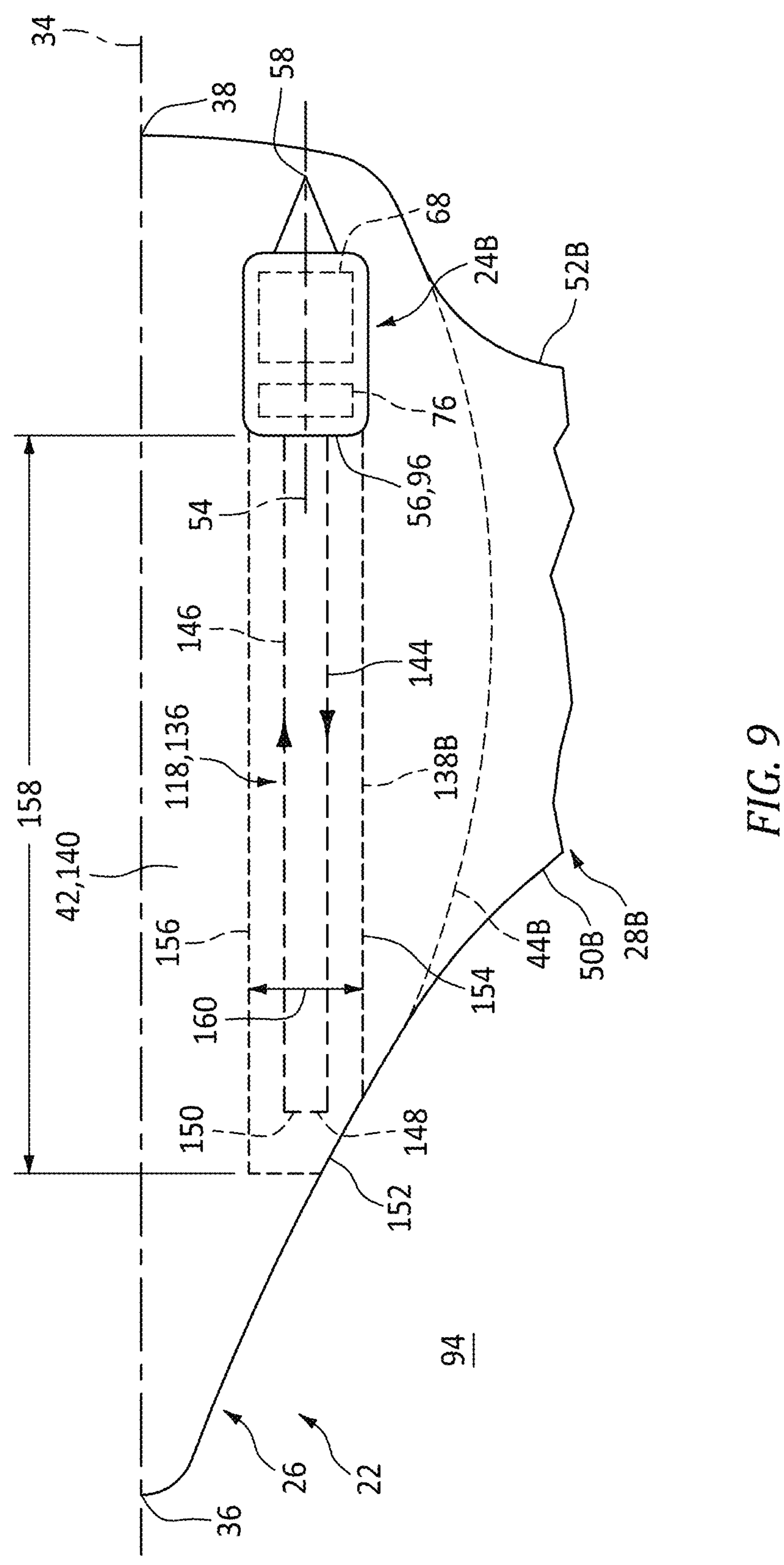
FIG. 9 is a close-up plan view illustration of a portion of the aircraft along a region heated by the thermal anti-icing system.
Figure 11:
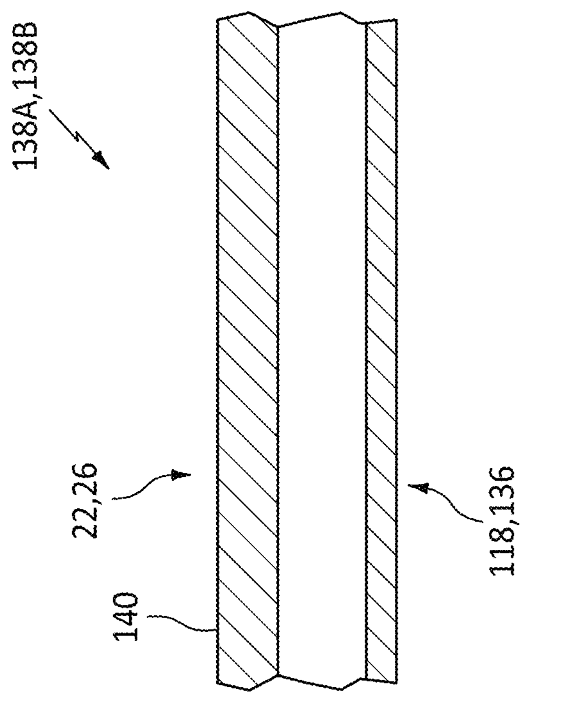
FIGS. 10 and 11 are partial sectional illustrations of various fluid heating circuit arrangements with the airframe.

Referring to FIG. 9, the fluid heating circuit 136 is configured to heat at least (or only) a region 138A, 138B (generally referred to as "138") (see also FIG. 1) of an exterior surface 140 of the aircraft airframe 22. More particularly, the fluid heating circuit 136 is configured to transfer heat energy from the working fluid (e.g., heated by the heat exchanger 114 of FIG. 5) into material of the aircraft airframe 22 forming the exterior surface 140 within the heated region 138. For example, referring to FIG. 10, the fluid heating circuit 136 may be configured as or otherwise include a fluid conduit 142 (e.g., a pipe, a hose, a tube, etc.) which is separate from a structure of the aircraft airframe 22, but is thermally coupled to the structure of the aircraft airframe 22 via conduction. Referring to FIG. 11, the fluid heating circuit 136 may alternatively (or also) be integrated into (e.g., formed by) the structure of the aircraft airframe 22; e.g., extend through the material of the aircraft airframe 22 forming the exterior surface 140 within the heated region 138.

Referring to FIG. 9, the fluid heating circuit 136 extends longitudinally along the exterior surface 140 of the aircraft airframe 22 at least (or only) within the heated region 138. The fluid heating circuit 136 of FIG. 9, for example, includes a supply circuit path 144 and a return circuit path 146. The supply circuit path 144 projects longitudinally along the centerline 34 and along the exterior surface 140 of the aircraft airframe 22 within the heated region 138 away from a respective aircraft propulsion system 24 to a distal end 148 of the fluid heating circuit 136. At the distal end 148 of the fluid heating circuit 136, the supply circuit path 144 is fluidly coupled to the return circuit path 146 in series through a coupling circuit path 150 (e.g., a bridge path). The return circuit path 146 projects longitudinally along the centerline 34 and along the exterior surface 140 of the aircraft airframe 22 within the heated region 138 from the distal end 148 of the fluid heating circuit 136 towards the respective aircraft propulsion system 24. The return circuit path 146 of FIG. 9 is laterally spaced from the supply circuit path 144 and may be parallel to the supply circuit path 144. With this arrangement, the fluid heating circuit 136 has a footprint (e.g., outer periphery) that substantially matches, but may be laterally and/or longitudinally recessed inward from a footprint of the heated region 138 of the exterior surface 140 since the heat energy transferred into the material of the aircraft airframe 22 forming the exterior surface 140 may flux outward from the fluid heating circuit 136.

The heated region 138 of the exterior surface 140 of FIG. 9 is disposed at and may at least partially (or completely) form a top side of the aircraft airframe 22, at least longitudinally upstream of the respective aircraft propulsion system 24. The aircraft body 26 of FIG. 9 includes the heated region 138 of the exterior surface 140, and the airframe top side is also the body top side 42. However, it is contemplated a respective one of the aircraft wings 28 may also (or alternatively) include at least a portion of the heated region 138 of the exterior surface 140.

The heated region 138 of the exterior surface 140 is longitudinally upstream of and laterally overlaps (e.g., is aligned with) the respective aircraft propulsion system 24 and members 76 and 96. The heated region 138 of the exterior surface 140 of FIG. 9, for example, projects longitudinally along the centerline 34 (in an upstream direction) out from the propulsion system upstream end 56 to a location along a leading edge 152 of the aircraft airframe 22 (e.g., the aircraft body 26) and laterally aligned with the respective aircraft propulsion system 24. However, in other embodiments, the heated region 138 of the exterior surface 140 may be (e.g., slightly) longitudinally recessed downstream from the leading edge 152 of the aircraft airframe 22. In addition or alternatively, the heated region 138 of the exterior surface 140 may be (e.g., slightly) longitudinally spaced from the propulsion system upstream end 56. The heated region 138 of the exterior surface 140 of FIG. 9 also extends laterally between opposing lateral sides 154 and 156 of the heated region 138. These lateral sides 154 and 156 of the heated region 138 may be substantially parallel. The heated region 138 of the exterior surface 140 of FIG. 9 may thereby have a substantially rectangular shape. The present disclosure, however, is not limited to such an exemplary arrangement. For example, referring to FIG. 12, the heated region 138 of the exterior surface 140 may alternatively have another polygonal shape such as a substantially (e.g., regular or irregular) trapezoidal shape or another non-rectangular shape.

Figure 12:
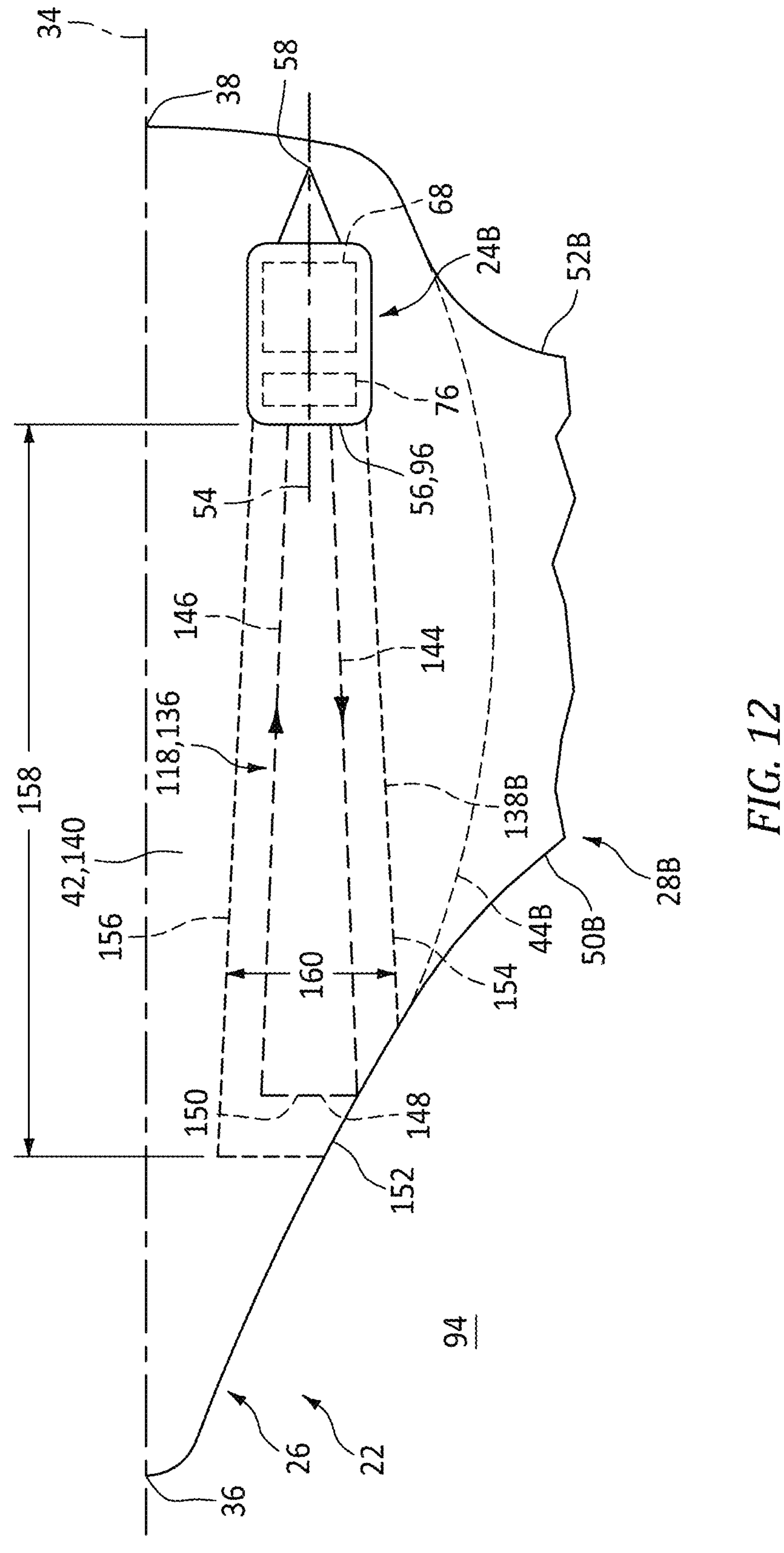
FIG. 12 is a close up plan view illustration of a portion of the aircraft along another region heated by the thermal anti-icing system.

Referring to FIGS. 9 and 12, the heated region 138 of the exterior surface 140 has an end-to-end longitudinal length 158 along the centerline 34 and a side-to-side lateral width 160. Referring to FIG. 9, the fluid heating circuit 136 may be configured such that the heated region width 160 along at least a portion or an entirety of the heated region length 158 remains uniform (constant). Alternatively, referring to FIG. 12, the fluid heating circuit 136 may be configured such that the heated region width 160 along at least a portion or an entirety of the heated region length 158 (continuously or incrementally) changes. The fluid heating circuit 136 of FIG. 12, for example, is configured such that the heated region width 160 increases as the heated region 138 extends longitudinally away from the respective aircraft propulsion system 24/towards the leading edge 152 of the aircraft airframe 22.

Figure 8:
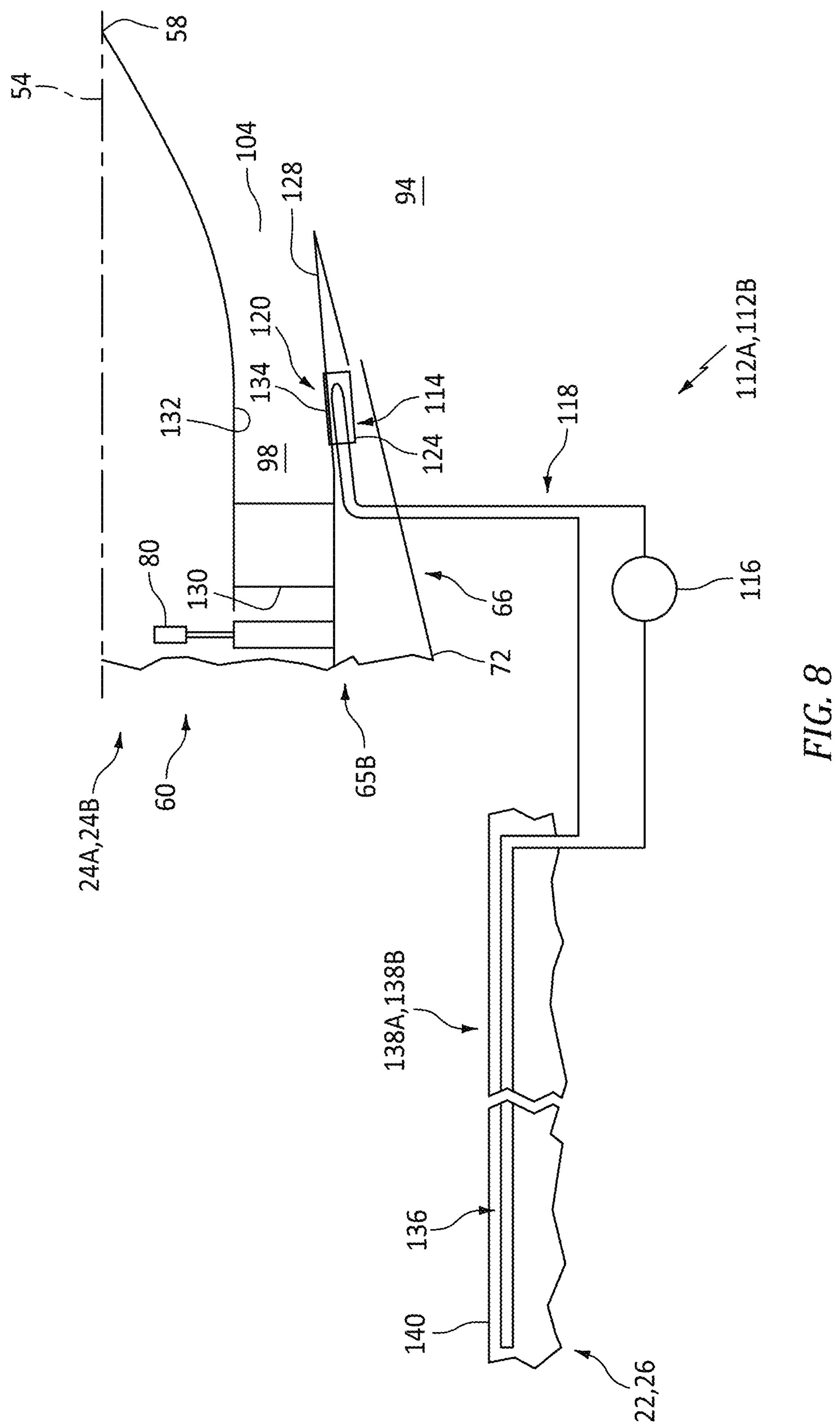
FIG. 8 is a schematic illustration of the thermal anti-icing system arranged with the propulsion system and the airframe, where the flow regulator for the thermal anti-icing system is in a closed position.
Figure 10:
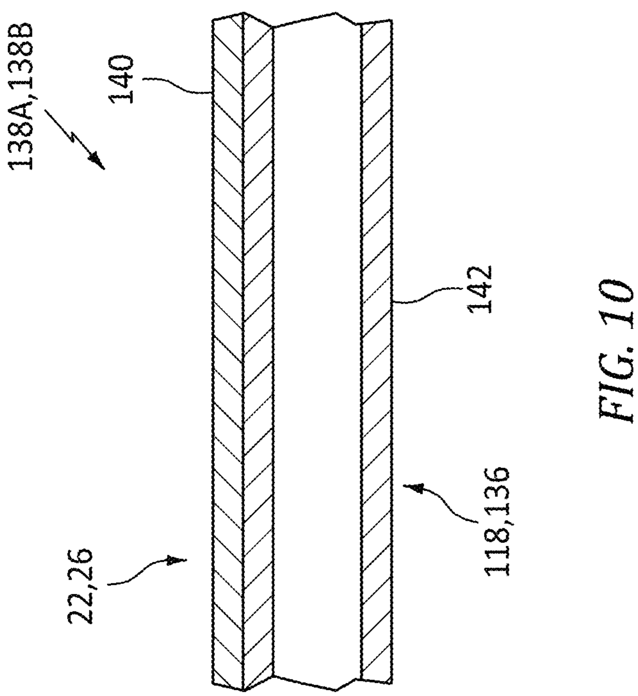

During operation of the thermal anti-icing system 112 of FIG. 5, the heat exchanger 114 transfers heat energy from the bled combustion products into the working fluid circulating through the heating loop 118 when the flow regulator 120 is partially or completely open. The fluid pump 116 circulates the working fluid through the heating loop 118 such that the heated working fluid is directed into the fluid heating circuit 136. Referring to FIGS. 10 and 11, as the heated working fluid flows through the fluid heating circuit 136, the thermal energy is transferred from the heated working fluid into the material of the aircraft airframe 22 forming the exterior surface 140 at least within the heated region 138. Each thermal anti-icing system 112 of FIG. 5 is thereby operable to utilize (e.g., waste) heat energy from the combustion products to heat and thereby reduce or prevent ice accumulation on the exterior surface 140 of the aircraft airframe 22 within the heated region 138. However, when the flow regulator 120 of FIG. 8 is closed and the thermal anti-icing system 112 is non-operational, the combustion products (which would otherwise be bleed during thermal anti-icing system operation) are exhausted from the aircraft propulsion system 24 and its core exhaust 104 to provide additional propulsion system thrust.

Figures 13, 14, 15:
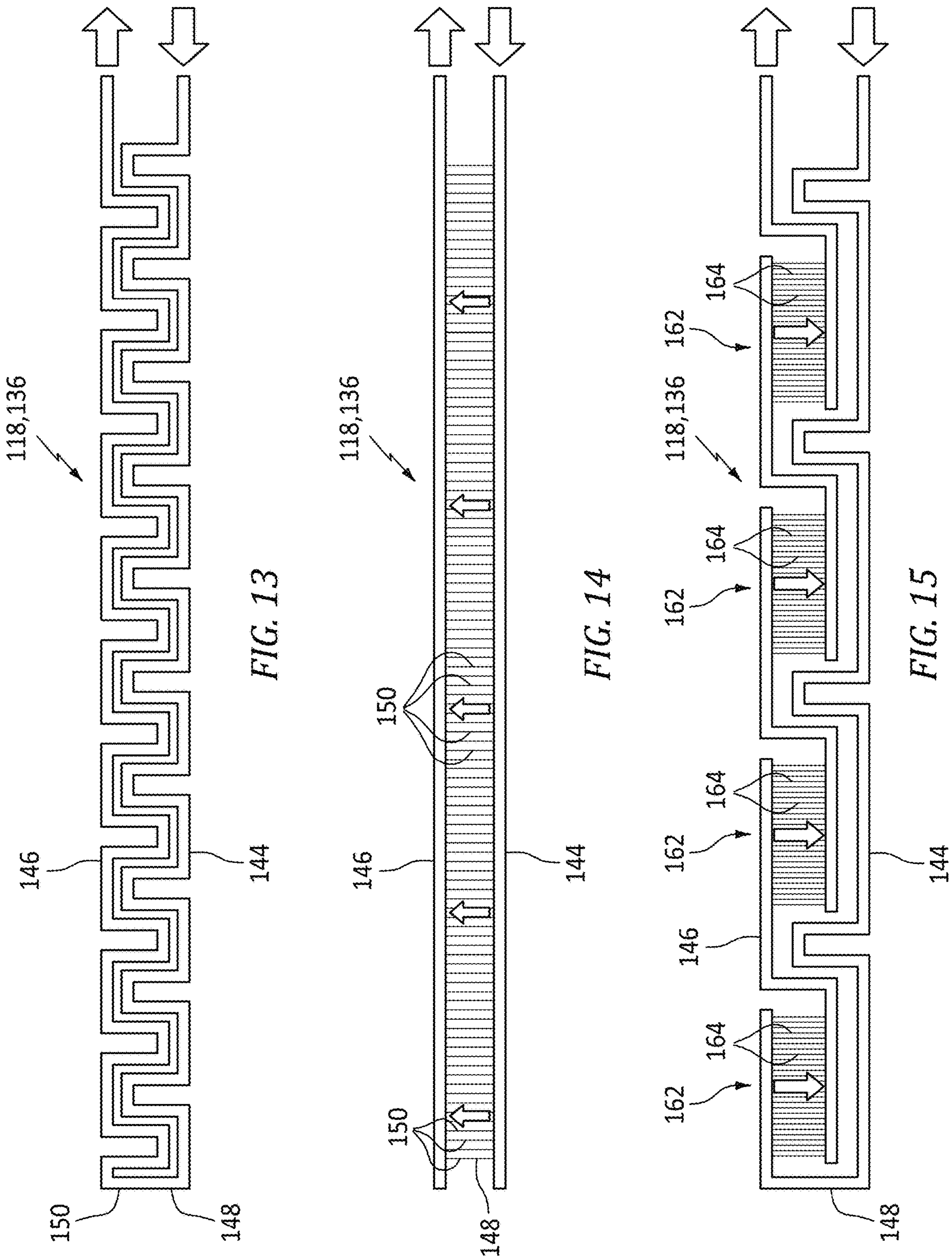
FIGS. 13-15 are schematic illustrations of the fluid heating circuit with various circuit arrangements.

In some embodiments, referring to FIG. 5, the fluid heating circuit 136 may have a simple two pass arrangement. The present disclosure, however, is not limited to such an exemplary arrangement. For example, while the supply circuit path 144 and the return circuit path 146 of FIG. 5 each follow a straight line trajectory (e.g., when viewed in a horizontal plane perpendicular to gravity), the supply circuit path 144 and/or the return circuit path 146 may alternatively follow a non-straight trajectory. The supply circuit path 144 and the return circuit path 146 of FIG. 13, for example, each follows a tortuous (e.g., zig-zag, etc.) trajectory. In another example, while the return circuit path 146 of FIG. 5 is fluidly coupled to the supply circuit path 144 in series through the single coupling circuit path 150, the return circuit path 146 may alternatively be fluidly coupled to the supply circuit path 144 by multiple of the coupling circuit paths 150. The coupling circuit paths 150 of FIG. 14, for example, are arranged (e.g., and equispaced) longitudinally along the supply circuit path 144 and the return circuit path 146. These coupling circuit paths 150 are fluidly coupled in parallel between the supply circuit path 144 and the return circuit path 146. In still another example, referring to FIG. 15, at least (or only) one of the circuit paths 144, 146 (e.g., the return circuit path 146 in FIG. 15) may be separated into a plurality of heating sections 162. Each heating section 162 may include a plurality of parallel intra-circuit path couplings 164. Moreover, while different aspects of the fluid heating circuit 136 are shown separately in FIGS. 5 and 13-15 for ease of illustration, it is contemplated any one or more of these different aspects may be combined together.

Each thermal anti-icing system 112 is generally described above (e.g., see FIG. 5) as being associated with a single aircraft propulsion system 24. The region 138 of the exterior surface 140 heated by the fluid heating circuit 136, for example, is located in front of (e.g., upstream of and laterally aligned with) the same aircraft propulsion system 24 from which the heat exchanger 114 fluidly coupled to that fluid heating circuit 136 extracts the thermal energy. The present disclosure, however, is not limited to such an exemplary arrangement. It is contemplated, for example, a single thermal anti-icing system 112 may heat the regions 138 in front of each of the aircraft propulsion systems 24.

While the aircraft 20 is described above as a blended wing body aircraft, the present disclosure is not limited to such an exemplary aircraft configuration. The thermal anti-icing system(s) 112 of the present disclosure, for example, may be configured with other types of aircraft where there is an exterior surface in front of a respective aircraft propulsion system to be heated. While each aircraft propulsion system 24 is described above with a ducted propulsor rotor (e.g., the fan rotor 76), the present disclosure is not limited to such an exemplary propulsion system configuration. Each aircraft propulsion system 24, for example, may alternatively include an open propulsor rotor driven by the respective engine core 68. Moreover, while each aircraft propulsion system 24 is described above as a turbine engine, each aircraft propulsion system 24 may alternatively include another type of combustion engine, heat engine, electric machine or another type of power unit driving rotation of its propulsor rotor(s).

Additionally, while the thermal anti-icing system(s) 112 of the present disclosure are described herein as being coupled to a propulsion systems 24, this is not intended to be so limiting and the thermal anti-icing system(s) 112 may be coupled to a non-propulsion generating engine, such as an auxiliary power unit.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft, comprising:

an airframe including a body and a plurality of wings, the body extending longitudinally along a centerline, the plurality of wings disposed to opposing lateral sides of the body, and each of the plurality of wings projecting spanwise out from the body;

a propulsion system connected to the airframe, the propulsion system including a combustor section and a core flowpath that extends through the combustor section; and a thermal anti-icing system configured to heat a region of an exterior surface of the airframe longitudinally upstream of and laterally overlapping with the propulsion system, the thermal anti-icing system comprising a working fluid and a heat exchanger, the heat exchanger configured to transfer heat energy from combustion products generated by the combustor section into the working fluid;

wherein the thermal anti-icing system further comprises a flow regulator configured to selectively bleed the combustion products directly from the core flowpath.

2. The aircraft of claim 1, wherein the propulsion system is next to and above a top side of the airframe; and the exterior surface of the airframe is disposed at the top side of the airframe.

3. The aircraft of claim 1, wherein the propulsion system is connected to the airframe at a top side of the airframe; and the exterior surface of the airframe is disposed at the top side of the airframe.

4. The aircraft of claim 1, wherein the region of the exterior surface of the airframe is longitudinally upstream of and laterally aligns with a propulsor rotor of the propulsion system.

5. The aircraft of claim 1, wherein the region of the exterior surface of the airframe is longitudinally upstream of and laterally aligns with an airflow inlet into the propulsion system.

6. The aircraft of claim 1, wherein the region of the exterior surface of the airframe extends longitudinally to a leading edge of the airframe.

7. The aircraft of claim 1, wherein the region of the exterior surface of the airframe extends longitudinally upstream from the propulsion system towards a leading edge of the airframe.

8. The aircraft of claim 1, wherein the region of the exterior surface of the airframe has a longitudinal length and a lateral width; and the lateral width has a uniform value longitudinally along at least a section of the longitudinal length.

9. The aircraft of claim 1, wherein the region of the exterior surface of the airframe has a longitudinal length and a lateral width; and the lateral width changes longitudinally along at least a section of the longitudinal length.

10. The aircraft of claim 1, wherein a lateral width of the region of the exterior surface of the airframe increases as the region of the exterior surface of the airframe extends longitudinally in an upstream direction away from the propulsion system.

11. The aircraft of claim 1, wherein the thermal anti-icing system comprises a fluid heating circuit;

the fluid heating circuit is disposed in the airframe; and the fluid heating circuit extends along the region of the exterior surface of the airframe.

12. The aircraft of claim 11, wherein the heat exchanger is fluidly coupled to the fluid heating circuit; and the fluid heating circuit is configured to transfer the heat energy from the working fluid into material of the airframe forming the exterior surface of the airframe within the region.

13. The aircraft of claim 12, wherein the propulsion system further includes a compressor section and a turbine section;

the core flowpath extends through the compressor section, the combustor section and the turbine section from an inlet into the core flowpath to an exhaust from the core flowpath; and the heat exchanger is arranged along the core flowpath downstream of the combustor section.

14. The aircraft of claim 1, wherein the body comprises the region of the exterior surface of the airframe.

15. The aircraft of claim 1, wherein the airframe is configured as a blended body aircraft airframe.

16. The aircraft of claim 1, wherein the propulsion system comprises a turbofan propulsion system.

17. An aircraft, comprising:

an airframe including a body and a plurality of wings, the body extending longitudinally along a centerline, the plurality of wings disposed to opposing lateral sides of the body, and each of the plurality of wings projecting spanwise out from the body;

a propulsion system connected to the airframe, the propulsion system including a propulsor rotor and a turbine engine core configured to drive rotation of the propulsor rotor, and the turbine engine core comprising a core flowpath; and a thermal anti-icing system including a heat exchanger and a fluid heating circuit, the heat exchanger including a combustion products passage and a working fluid passage, the combustion products passage fluidly couplable to the core flowpath, the working fluid passage fluidly couplable to the fluid heating circuit, the fluid heating circuit extending along a region of an exterior surface of the airframe longitudinally upstream of and laterally aligned with the propulsor rotor, and the fluid heating circuit in thermal communication with material of the airframe forming the region of the exterior surface of the airframe;

wherein the thermal anti-icing system further comprises a flow regulator configured to selectively bleed combustion products directly from the core flowpath and direct the combustion products to the combustion products passage.

18. The aircraft of claim 17, wherein the aircraft is a blended wing body aircraft; and the body comprises the material of the airframe forming the region of the exterior surface of the airframe.

19. An aircraft, comprising: a blended wing body airframe;

a propulsion system connected to the blended wing body airframe, the propulsion system including a propulsor rotor and a turbine engine core configured to drive rotation of the propulsor rotor, and the turbine engine core comprising a combustor section and a core flowpath; and a thermal anti-icing system including a heat exchanger and a fluid heating circuit, the heat exchanger including a combustion products passage and a working fluid passage, the combustion products passage fluidly couplable to the core flowpath downstream of the combustor section, the working fluid passage fluidly couplable to the fluid heating circuit, and the fluid heating circuit extending along, and in thermal communication with material of the blended wing body airframe forming, an exterior surface of the blended wing body airframe;

wherein the thermal anti-icing system is configured to selectively bleed combustion products directly from the core flowpath and direct the combustion products to the combustion products passage.

20. The aircraft of claim 1, wherein the flow regulator comprises at least one movable flow regulator door configured to move between an open position and a closed position.

* * * * *